W. BOSS.
GRASS COLLECTOR FOR LAWN MOWERS.
APPLICATION FILED APR. 8, 1907. RENEWED JAN. 20, 1912.
1,039,355.
Patented Sept. 24, 1912.
2 SHEETS—SHEET 1.
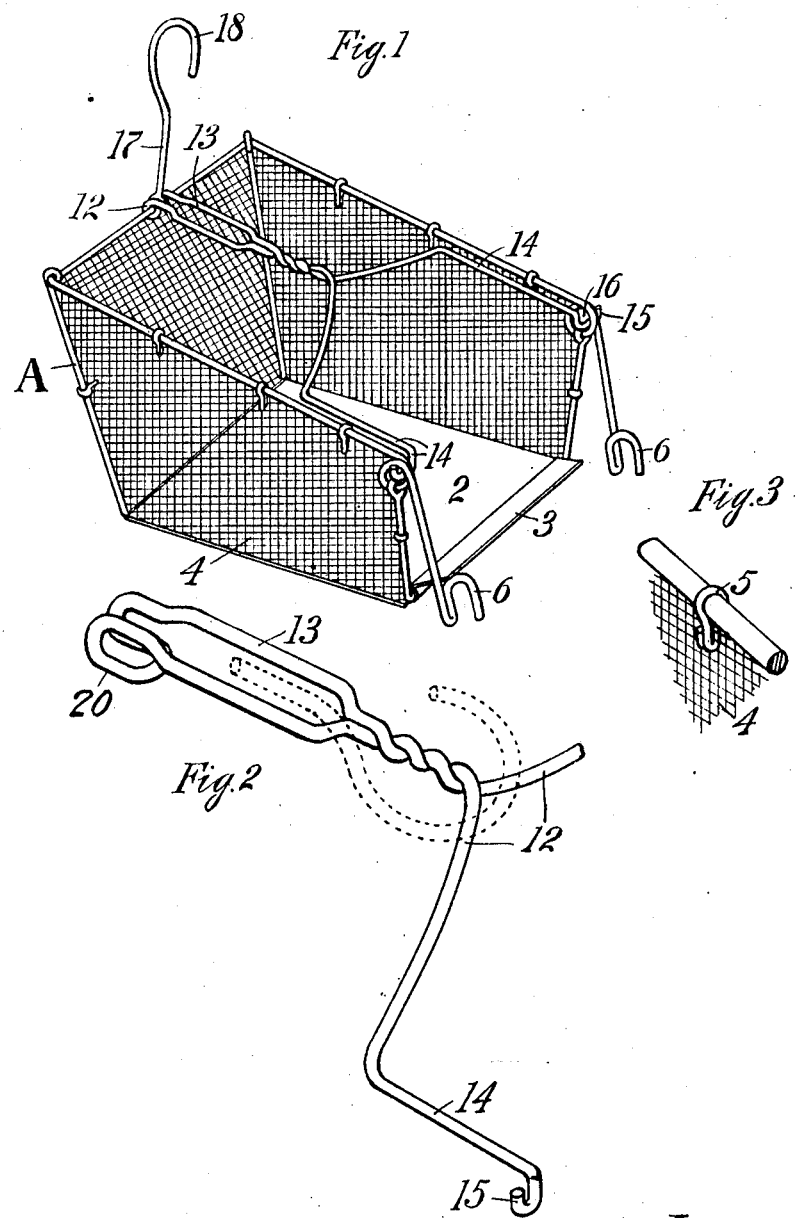
Witnesses,
George Voelker
Hattie Smith
Inventor,
William Boss
by Lothrop Johnson
his Attorneys.

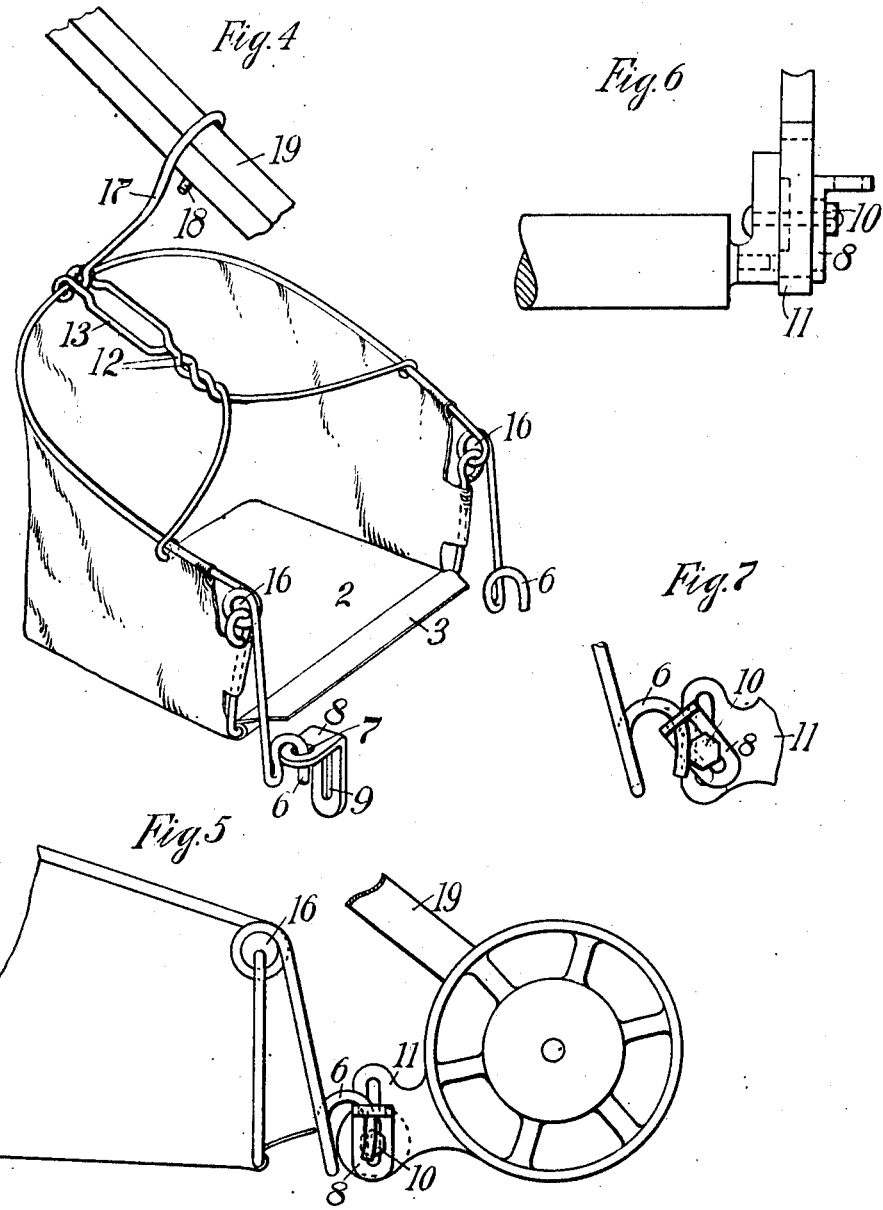

UNITED STATES PATENT OFFICE.

WILLIAM BOSS, OF ST. PAUL, MINNESOTA.

GRASS-COLLECTOR FOR LAWN-MOWERS.

1,039,355. Specification of Letters Patent. Patented Sept. 24, 1912.

Application filed April 8, 1907, Serial No. 366,933. Renewed January 20, 1912. Serial No. 672,475.

*To all whom it may concern:*

Be it known that I, WILLIAM BOSS, a citizen of the United States, residing at St. Paul, in the county of Ramsey and State of Minnesota, have invented certain new and useful Improvements in Grass-Collectors for Lawn-Mowers, of which the following is a specification.

My invention relates to improvements in grass collectors for lawn mowers and consists particularly in improved means for supporting the receptacle from the lawn mower frame and handle, while at the same time securing a receptacle that is easy to manipulate and to nest with similar receptacles.

To this end my invention consists in the features of construction and combination hereinafter particularly described and claimed.

In the accompanying drawings forming part of this specification, Figure 1 is a perspective view of my improved grass collector, Fig. 2 is a perspective view of the handle portion partly broken away, Fig. 3 is a detail showing the method of affixing the wire sides to the frame work, Fig. 4 is a perspective view of a modified construction of the receptacle, Fig. 5 is a side elevation of the same broken away and shown attached to the lawn mower frame, Fig. 6 is a detail view of a portion of the lawn mower and an attaching bracket for the receptacle, and Fig. 7 is a detail of the attaching bracket and adjacent parts.

In the accompanying drawings A represents the frame work of the receptacle consisting of wires bent to form top and side bars, and 2 represents a suitably connected bottom plate. The bottom plate is preferably formed at its front end with an upwardly turned flange 3. The sides of the receptacle are constructed of wire meshing 4 suitably connected along the bottom to the plate 2 connected to the top and side bars of the frame by means of loops 5. These loops are preferably of wire bent to encircle the frame bars A and to extend through the meshing 4. The pieces of wire forming the top of the receptacle are, as shown, bent to pass through the upper looped ends of the wires forming the front ends of the receptacle and are then carried downwardly and formed with hooks 6 adapted to fit in the openings 7 in the supporting brackets 8. The supporting brackets 8 are of angle shape, as shown, the vertical sides of the brackets being formed with slotted openings 9 to receive the bolts 10 carried by the lawn mower frame 11. Thus the brackets 8 may be swung upon the bolts 10 and also raised and lowered thereon to adjust the position of the receptacle with reference to the mower.

The handle portion of the receptacle is constructed with special reference to its use in handling and carrying the receptacle when the same is detached from the lawn mower, and to that end is so constructed as to support the receptacle at several different points and have a central carrying grip, so that the receptacle will balance when carried thereby. With the same end in view, the handle is so constructed that all parts of it will lie within the framework. To this end the handle consists of a wire 12 bent upon itself at the middle at 20 to engage and embrace the top bar at the rear of the frame. The two wire portions are then carried forwardly and spread to form a hand grip 13. They are then twisted together and carried apart to the side bars of the frame. The front ends 14 of these wire portions are bent to form hooks 15, which engage eyes 16 at the upper front ends of the framework. The receptacle is detachably connected with the handle 19 of the lawn mower by means of an arm 17 having swing support upon the rear top bar of the frame work between the spaced bent portions of the handle wire 12, and formed at the top with a hook 18 to engage the handle of the lawn mower. When the arm is unhooked from the handle of the lawn mower it will drop down, as indicated by dotted lines in Fig. 2, so as to lie parallel with the handle 12 so that it can be grasped therewith when it is desired to carry and empty the receptacle.

In the modified construction shown in Fig. 4, the sides are made of canvas instead of wire meshing and the front ends of the handle wire 12 are hooked over the side bars or wires of the frame instead of being hooked through the eyes 16 at their front ends; otherwise, the construction is essentially the same as that shown in Fig. 1.

I claim:

1. The combination with a lawn mower and its handle bar, of a grass receptacle removably supported at its front end upon the lawn mower, a handle for the receptacle consisting of wire portions formed with terminal hooks at its extreme ends having engagement respectively with the sides and rear of the receptacle and intermediately brought together to form a hand grip and a hook having swing support on the rear of the receptacle alongside the rear hook of the handle portion and detachably engaging the mower handle.

2. In combination with a lawn mower and handle, a grass catching receptacle having means at its front ends for detachably engaging with said lawn mower frame, a handle 13 extending from the rear of said lawn mower receptacle to the opposite sides thereof and having separated portions at its point of attachment to the rear side of said receptacle, and an arm having swing support upon said receptacle between said separated portions, for the purpose set forth.

3. In combination with a lawn mower frame and handle, angle shaped brackets having slidable swing support upon said frame, a grass catching receptacle having means at its front ends for detachably engaging with the out-turned ends of said brackets, and an arm for detachably connecting the rear end of said receptacle and said lawn mower handle.

4. The combination, with a lawn mower and its handle bar, of a grass receptacle detachably supported at its front end upon the lawn mower, a handle for the receptacle consisting of wire portions centrally twisted together, the forward portions diverging forwardly and being formed with terminal hooks engaging the sides of the receptacle, and the rear portions being spaced apart and secured over the top member of the receptacle frame at the rear, and an arm having swing support upon the top member of the receptacle between the spaced wire portions and detachably engaging the handle bar of the mower.

In testimony whereof I affix my signature in presence of two witnesses.

WILLIAM BOSS.

Witnesses:
H. S. JOHNSON,
HATTIE SMITH.

---

Copies of this patent may be obtained for five cents each, by addressing the "Commissioner of Patents, Washington, D. C."